E. A. SPERRY.
FUEL INJECTING AND IGNITING MEANS FOR OIL ENGINES.
APPLICATION FILED MAR. 15, 1918.
1,432,214.
Patented Oct. 17, 1922.
3 SHEETS—SHEET 1.
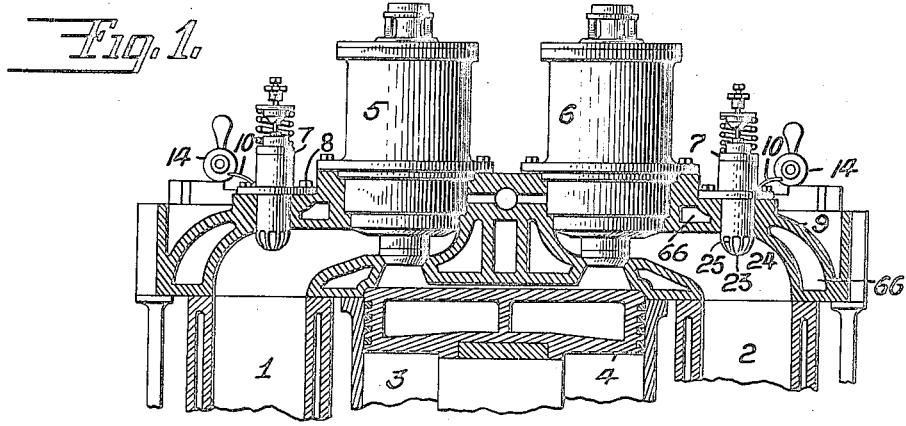
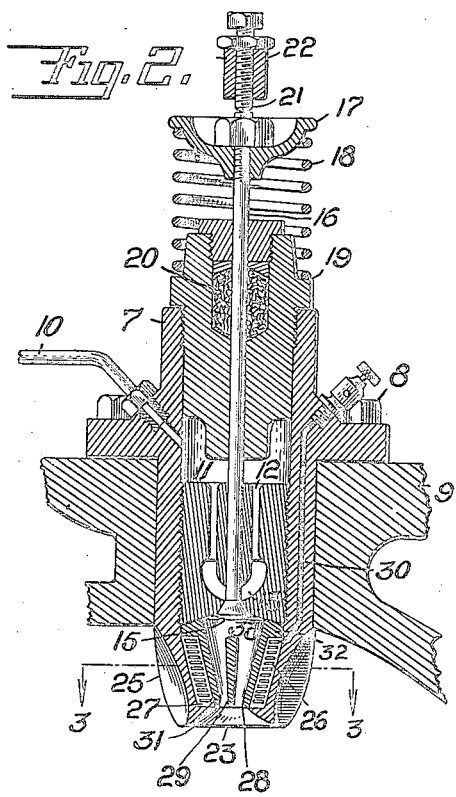
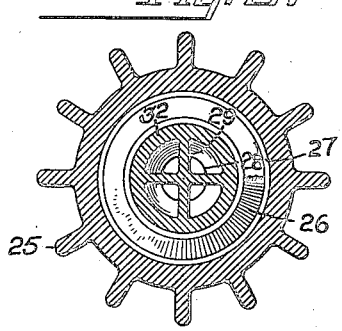
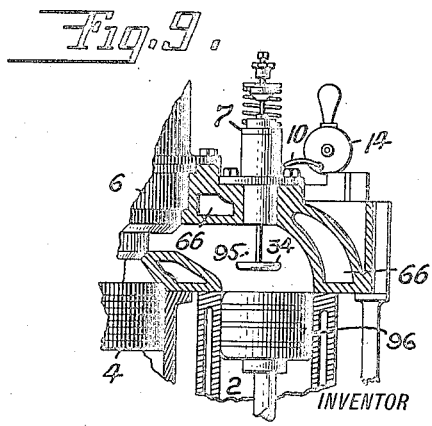
INVENTOR
Elmer A. Sperry.
BY
Herbert H. Thompson
ATTORNEY

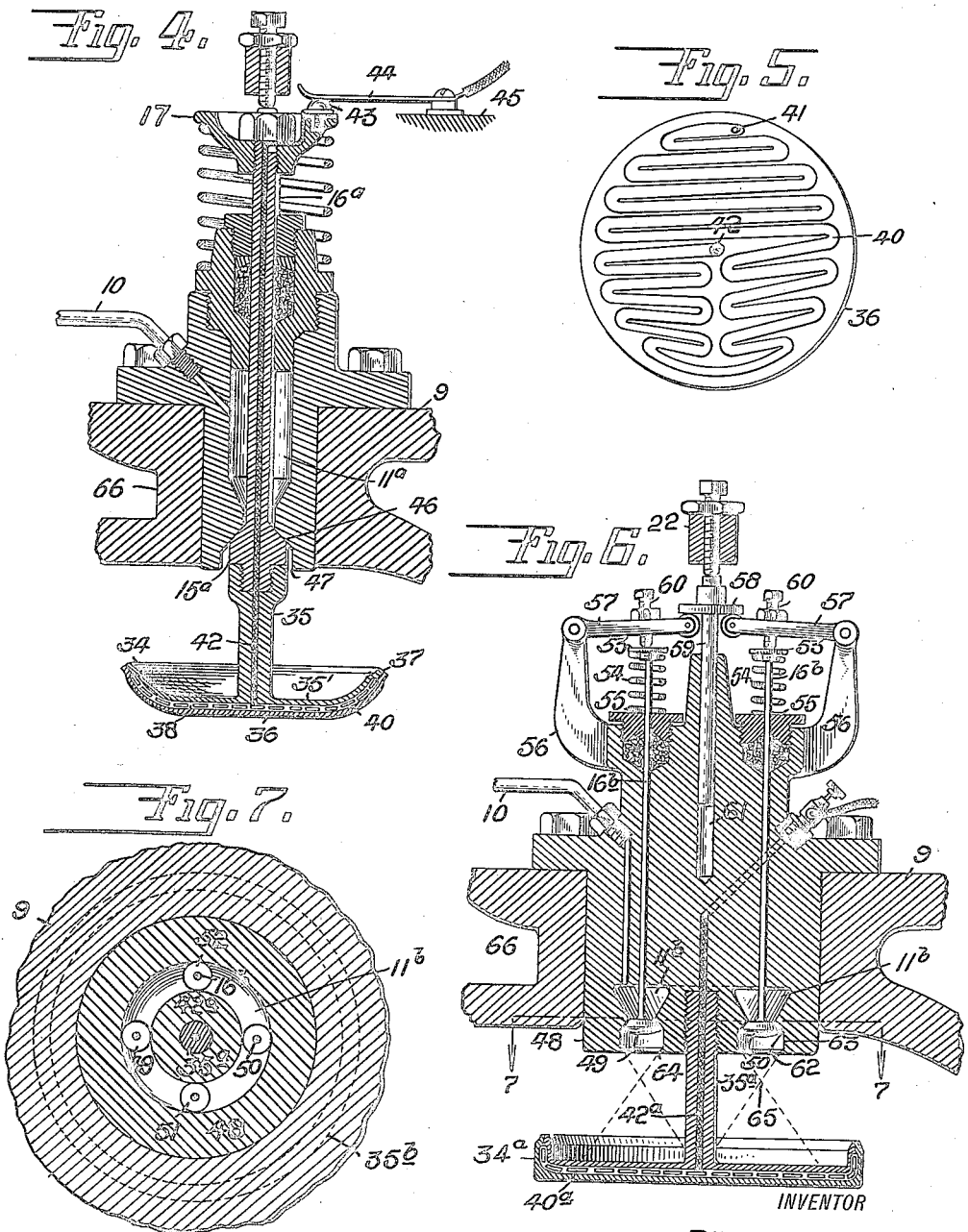

E. A. SPERRY.
FUEL INJECTING AND IGNITING MEANS FOR OIL ENGINES.
APPLICATION FILED MAR. 15, 1918.
1,432,214.
Patented Oct. 17, 1922.
3 SHEETS—SHEET 3.
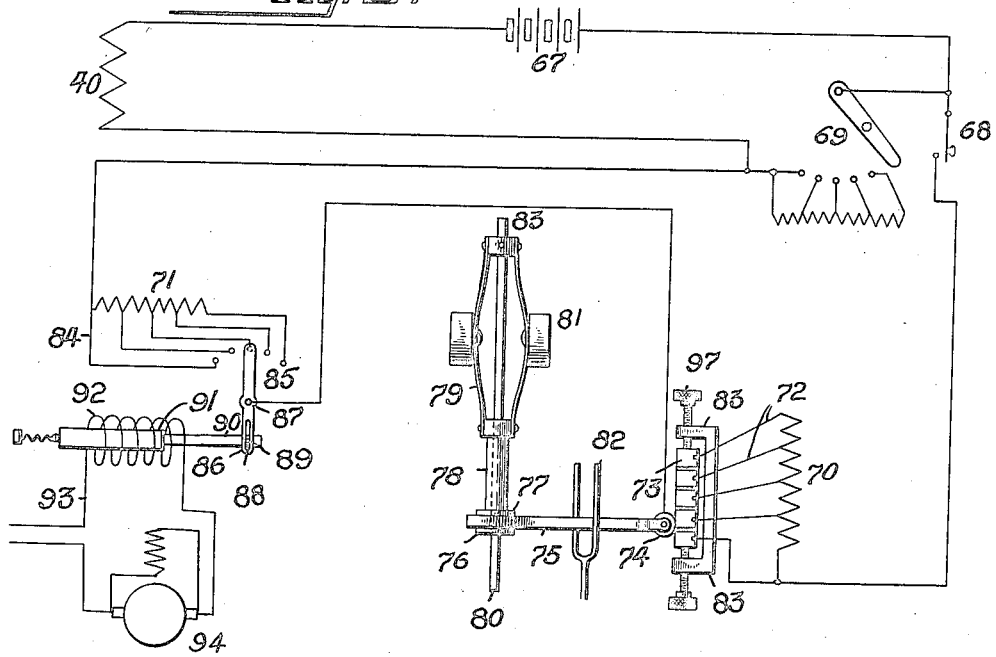
INVENTOR
Elmer A. Sperry.
BY
Herbert H. Thompson
ATTORNEY Patented Oct. 17, 1922.

1,432,214

UNITED STATES PATENT OFFICE.

ELMER A. SPERRY, OF BROOKLYN, NEW YORK.

FUEL INJECTING AND IGNITING MEANS FOR OIL ENGINES.

Application filed March 15, 1918. Serial No. 222,614.

*To all whom it may concern:*

Be it known that I, ELMER A. SPERRY, a citizen of the United States of America, residing at Brooklyn, in the county of Kings and State of New York, have invented certain new and useful Improvements in Fuel Injecting and Igniting Means for Oil Engines, of which the following is a specification.

This invention relates to fuel injection and ignition for internal combustion engines.

In internal combustion engines using oil as fuel, where simple injection of the oil is effected, perfect combustion fails to take place, part of the oil carbonizing and forming a coating within the cylinder and impeding proper operation. To overcome this feature, the practice has been to inject the oil into the cylinder by means of super-compressed air. The function of the air is in part to atomize the oil as it enters the cylinder, thereby preparing it for more complete combustion which is caused by the excessively high temperature of the air in the cylinder at the end of the compression stroke.

Numerous unsuccessful attempts have been made to do away with the jet of super-compressed fuel injecting air.

The principal object of this invention is to provide a method and means for injecting the fuel into the cylinder or combustion space, and to cause atomization thereof without the aid of compressed air, and to provide means for heating the said fuel, upon its becoming atomized, to a temperature sufficient to cause or aid immediate, perfect and complete combustion thereof.

A further object is to provide automatic means for controlling the temperature of the fuel heating means for varying the heat imparted thereby to the fuel in response to both the varying of the speed of the engine and the varying of the load impressed thereon.

Referring to the drawings wherein I have shown what I now consider to be the preferred forms of my invention:

Fig. 1 is a sectional side elevation of the upper part of an engine embodying my invention.

Fig. 2 is a sectional elevation of one form of oil inlet valve.

Fig. 3 is a section taken on line 3—3, Fig. 2.

Fig. 4 is a sectional elevation of a modified form of fuel inlet valve, showing means for heating and igniting the fuel as it is injected.

Fig. 5 is a detail of the lower portion of Fig. 4.

Fig. 6 is an elevation of a further modification of the fuel inlet valve.

Fig. 7 is a section taken on line 7—7, Fig. 6.

Fig. 8 is a wiring diagram of means for controlling the heat applied to the fuel when it is injected.

Fig. 9 is a detail showing the location of the fuel heating means.

While my invention may be applied to various forms of simple or compound internal combustion engines, I have demonstrated it here in connection with a compound engine wherein 1 and 2 represent high pressure cylinders and 3 represents a low pressure cylinder; the low pressure piston being shown at 4. The transfer valves between the high pressure cylinders and the low pressure cylinders are shown at 5 and 6, while the fuel inlet valves are shown at 7, secured in any suitable manner, as for instance by bolts 8 to the top or cylinder head piece 9.

The internal structure of valves 7 is shown in Fig. 2. In this figure a tube 10 is shown communicating with a chamber 11 within the valve casing for introducing fuel thereto. Ducts 12 are shown for permitting the passage of the fuel to the lower valve chamber 13. The fuel is preferably supplied under pressure by any suitable means, such as a fuel pump 14 which may be actuated at the proper moment by any suitable connection with the engine cam shaft not shown, so that the fuel will be forced into the cylinder upon the opening of the valve.

The head 15 of the valve is shown attached to a stem 16 which extends without the top of the valve casing and has secured adjacent its upper end a flange 17. A spring 18 pressing against flange 17 and the upper portion 19 of the valve casing holds the valve normally closed. A stuffing box 20 may be provided for the valve stem. The pressing down of stem 16 against the action of spring 18 will open the valve. A stud 21, in a lever 22 shown endwise and in section, is provided for pressing down upon the said stem; the lever being actuated by suitable connection with the engine cam shaft, not shown. The lower portion 23 of the valve casing is shown protruding into the combustion space 24 and may be provided with fins 25 on the outside. On the inside adjacent the bottom I have shown electrical heating means comprising a spiral electrical resistance member 26, see also Fig. 3; the spirals being suitably insulated from each other and from the surrounding metal by insulation 27. A covering for the coil 26 is shown comprising a metallic member 28 having cross ribs 29. An electric conductor 30 is shown connected to one end of coil 26, while the other end of said coil is shown as grounded at 31.

The purpose of the coil 26 is to heat the entire lower end of the valve member, including the fins 25 and the inner web piece or atomizer 32 comprising member 28 and ribs 29. The fins 25 are adapted to radiate heat produced by resistance 26 into the adjacent space in the cylinder and also to absorb some of the excessive heat produced by combustion within the cylinder when the engine is running at high speed, and impart it to the incoming fuel.

At the end of the compression stroke in the high pressure cylinder, the puppet valve 15 is adapted to open and permit the oil to be injected. The temperature of the compressed air is very high, but not sufficiently high to effect perfect combustion of the incoming oil. According to my invention, however, the air adjacent the valve is made hotter than elsewhere in the cylinder. Also the space 33 through which the oil passes and the web 32 against which it is forced are heated to high temperature. Thus the oil upon entering the cylinder is heated to a sufficiently high temperature to cause ignition and perfect combustion thereof.

In Fig. 4 I have shown a modified type of valve. In this form a saucer shaped baffle 34 is shown suspended below, and secured by means of a stem 35 to the valve head 15ª. The fuel is preferably forced through tube 10 into the valve chamber 11ª, so that when the valve is opened by the pressing down of stem 16ª, the fuel will be forced out between valve seat 46 and valve head 15ª and against the sides 47 of the valve where it will become deflected downwardly against the stem 35 and the baffle 34 with such force as to become wholly or partially atomized. In this condition the fuel will ordinarily become ignited by the heat of the air, but this heat as has been pointed out, may not be sufficient to effect perfect combustion. The baffle is therefore designed to be electrically heated to a point sufficient to cause or to aid in causing perfect combustion of the fuel as in the previous form of the invention.

To facilitate this heating, the baffle may comprise an upper plate 35' and a lower plate 36 placed one within the other and welded together at their edges 37. Between the two plates and insulated therefrom by insulation 38 is shown an electric resistance 40 (see also Fig. 5) which may be grounded at one end 41 to the baffle and connected at the other to a conductor 42 running up through stems 35 and 16ª to binding post 43 on flange 17. A resilient contact member 44 fastened at one end to a fixed part 45 of the engine and resting at the other end on binding post 43 may serve to introduce current to said post, and to maintain contact therewith during the up and down movements of the valve.

While the baffle will of course become heated, after the engine has been started, by the compressed air within the cylinder and by the heat produced by the combustion of the fuel, this heat is not sufficient to cause ignition to start the engine nor is it always sufficient to properly ignite the fuel during the running of the engine. The purpose, therefore, of the electric current is to heat the said baffle before the starting of the engine and to maintain its heat above that supplied by the compressed air and the combustion, when necessary, during the running of the engine.

A further modification of my invention is illustrated in Figs. 6 and 7. In this form the baffle 34ª is shown attached by means of stem 35ª to the valve unit 48. A plurality of small valves 49, 50, 51 and 52 may be employed. The fuel is introduced as before through tube 10 to valve chamber 11ᵇ which communicates with each of the valves. The stem 16ᵇ of each valve passes out through the top of the valve structure, and is shown as having a flange top piece 53. The valve is held normally in closed position by a spring 54 resting on the top of the valve structure at 55 and pressing upwardly against flange 53. A bracket 56 is shown extending upwardly from the valve structure. A lever arm 57 is pivoted at one end to said bracket and is engaged at the other by a flange 58 fixed on a central stem 59, while a pin 60 reaches down from lever 57 and engages the top of the valve stem 16ᵇ. The central stem 59 is adapted to move up and down in a hole 61 in the valve structure. The pressing down of lever 22 which as previously pointed out is effected by the engine cam shaft, will, through flange 58, lever 57 and pin 60, move the valve stems 16ᵇ downwardly, and effect the opening of all of the valves simultaneously, or if desired, pins 60 may be so adjusted that the valves may be opened successively, that is, one of the pins may be adjusted to hold its lever 57 against flange 58 when all of the valves are closed; the next pin may hold its lever 57 slightly away from flange 58, etc., so that said flange will engage the several levers successively. Furthermore, the set screw which is carried by actuating lever 22 and which engages the top of stem 59 may be so adjusted that only a portion of the valves will be opened. This, it will be observed, is done by so adjusting said set screw that the stroke of lever 22 will move stem 59 and flange 58 only far enough to engage and depress a portion of the levers 57.

The opening of each valve will permit the fuel to be forced around the edges 62 of the valve head, thence down the sides 63 of the valve and against the inwardly projecting edges 64 whence the fuel is diverted toward a central point as at 65. The meeting of the opposing walls of fuel will set up a whirling motion and atomize the fuel as it passes into contact with the baffle.

The heating coil for baffle $34^a$ is shown at $40^a$ and the supply line at $42^a$.

The engine is preferably adapted to be water cooled, for which purpose numerous water passages 66 are shown.

When combustion takes place within the cylinder, the temperature of the surrounding parts including the baffle will be greatly increased, but excessive heat in the baffle and valve and parts thereof will be conducted through the metal to the water and absorbed thereby.

In Fig. 8 I have shown diagrammatically, means for manually or automatically controlling the heating of the baffle or fuel ignition cup; the automatic control being governed in accordance with the working condition or conditions of the engine, preferably in accordance with the speed of the engine as well as to the load thereon.

In this figure, 40 represents the heating coil, 67 the source of electrical energy, 68 a switch and 69 a rheostat. To control the coil 40 manually, switch 68 may be opened and the control obtained by means of the rheostat 69. If both the switches and the rheostat are open, as in Fig. 8, the coil 40 is cut out entirely. This may be effected not only when the engine is at rest, but after it has been running for some time and has become heated, since in this type of engine the heat of precompression is frequently great enough to ignite the fuel after the engine is once started. For automatic control, on the other hand, switch 68 will be closed and the rheostat 69 thrown out. Two resistances 70 and 71 are placed in series with the heating coil 40. Resistance 70 is shown as tapped at several points by jumpers 72, each of which is connected to one of several contacts 73 adapted to be engaged by a roller 74 which forms a part of the circuit. The said roller is carried by an arm 75 engaged between two flanges 76—77 on a depending sleeve 78 of a governor 79. The shaft 80 of the said governor may be rotated in any suitable manner not shown, by the engine. When the engine is running and the governor rotates so as to cause the spreading of weights 81, it is seen that sleeve 78 will rise and carry arm 75 with it, thereby shifting roller 74 with relation to contacts 73, cutting in an increasing amount of resistance 70. It will be appreciated that as the speed of the engine increases and the frequency of combustion increases accordingly, the heat of the baffle will be increased by the combustion, so that less heat need be introduced through coil 40. The control of the heat introduced through coil 40, it will be seen, is effected by the cutting in or out of resistance 70. A relatively stationary guideway 82 is shown for preventing lateral displacement of arm 75 and roller 74.

Suitable means may be provided for varying the automatic control of current in coil 40. For this purpose I have shown contacts 73 as movably mounted between two relatively stationary brackets 83 and adapted to be adjusted by means of screws 97 in said brackets. The relative positions of roller 74 and contacts 73 may thus be varied for a given speed of the engine.

Resistance 71, which as we have seen, is also in series with coil 40, is shown as tapped by jumpers 84 connected to contacts 85. A lever arm 86, pivoted at 87 is adapted to cut in or out various sections of resistance 71. I have shown the said lever 86 as adapted to be actuated in response to the load placed upon a generator 94 which is driven by the engine. For this purpose the lever may be engaged in slot 88 by a pin 89 on stem 90 which is in turn fixed to the armature 91 of a solenoid 92; the solenoid being shown as connected in series with the working line 93 of the said generator 94. As the load increases and it becomes necessary to increase the fuel injection, whether by increasing the distance or length of time that the valve is open, to increase the power of the engine, the strength of the solenoid 92 will become greater, thereby actuating lever 86 and varying a proportional amount of resistance 71. The heat introduced to the baffle through coil 40 will thus be altered to suit the requirements of the engine.

While I have shown both resistances 70 and 71 connected in series with coil 40, it is obvious that one or the other only of said resistances may be used when desired.

The preferred position of the baffle with respect to the mass of the combustible gas within the cylinder is the center thereof. The center of this mass however changes during the stroke of the piston. Presuming the fuel to be entering during half the length of the stroke, the average center of this mass would be a point somewhere between the center at the beginning and at the middle of the stroke. Where the stroke is long, however, this point would lie in the path of the piston and would therefore be inaccessible as a location for the baffle. I prefer therefore to place the baffle 34 (Fig. 9) at a point slightly removed from the center 95 of the gaseous mass at the beginning of the stroke of the piston 96 in the direction of the center of the mass when the stroke is half completed.

In accordance with the provisions of the patent statues, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an internal combustion engine, a cylinder, a fuel inlet valve, means adjacent said valve for heating the fuel when the latter enters said cylinder and automatic means for decreasing the amount of heat imparted to said heating means as the speed of the engine increases.

2. In an internal combustion engine of the Diesel type, a cylinder, a fuel inlet valve, a baffle associated with said valve for intercepting the fuel when it enters said cylinder, means for heating said baffle and means controlled by the speed of said engine for regulating the temperature of said baffle inversely proportionate to said speed.

3. In an internal combustion engine, a cylinder, a fuel inlet valve, a baffle associated with said valve for intercepting the fuel when it enters said cylinder, electrical heating means for heating said baffle and means controlled by the speed of the engine for varying the effect of said heating means inversely proportionate to said speed.

4. In an internal combustion engine, a cylinder, a fuel inlet valve, a baffle associated with said valve for intercepting the fuel when it enters said cylinders, means for heating said baffle and means controlled by the load placed upon said engine for regulating the temperature of said baffle.

5. In an internal combustion engine, a cylinder, a fuel inlet valve, an electrically heated baffle associated with said valve for intercepting the fuel when it enters said cylinder, an electrical supply source connected with said baffle, a resistance, means for connecting variable portions of said resistance with said baffle and said supply and means actuated by said engine for controlling said connecting means.

6. In an internal combustion oil engine, a cylinder, a fuel inlet valve, a baffle associated with said valve in the path of the fuel when it enters said cylinder, electrical heating means for heating said baffle and means controlled by the working of said engine requirement for varying the heat of said baffle.

7. In an internal combustion engine, a cylinder, a fuel inlet valve therefor, means for actuating said valve, means for injecting fuel into said cylinder when said valve is open, a baffle adjacent said valve for intercepting the fuel as it enters said cylinder, means for heating said baffle and manual and automatic means for regulating the amount of heat introduced to said baffle.

8. In combination with a valve for an internal combustion engine, a baffle for intercepting fuel passing through said valve, said baffle comprising a plurality of parts secured together at their edges and an electrical resistance therebetween and entirely enclosed thereby for heating said baffle.

9. In an internal combustion engine, the combination with a cylinder, a fuel valve having a stem and valve seat therefor in said cylinder, and an electrically heated igniting and vaporizing member secured to said stem.

10. In an internal combustion engine, the combination with a cylinder, a fuel valve having a stem and valve seat therefor in said cylinder, and an electrically heated igniting and vaporizing member secured to said stem, said stem being hollow for the reception of an electrical conductor for supplying current to said member.

11. In an internal combustion engine, a cylinder, a fuel inlet valve therefor, means heated from an external source for igniting the fuel and variable means for regulating the amount of heat supplied by said external source in accordance with the power developed by the engine.

12. In an internal combustion engine, a cylinder, a fuel inlet valve therefor, means heated from an external source for igniting the fuel and variable means for regulating the amount of heat supplied by said external source in accordance with the power and speed developed by the engine.

13. In an internal combustion engine, a fuel inlet valve, an electric heating unit associated therewith for igniting the fuel, means for supplying current to said unit, a rheostat interposed in the circuit of said means and unit, an electric generator adapted to be actuated by the engine, and means controlled in accordance with the load upon said generator for actuating said rheostat.

14. In an internal combustion engine, the combination with a cylinder, a fuel valve having a stem and valve seat therefor in said cylinder, and an electrically heated igniting and vaporizing member secured to said stem, said stem being hollow for the reception of an electrical conductor for supplying current to said member, said member comprising a plurality of parts secured together at their edges and an electrical resistance therebetween for heating the same.

In testimony whereof I have affixed my signature.

ELMER A. SPERRY.